UNITED STATES PATENT OFFICE.

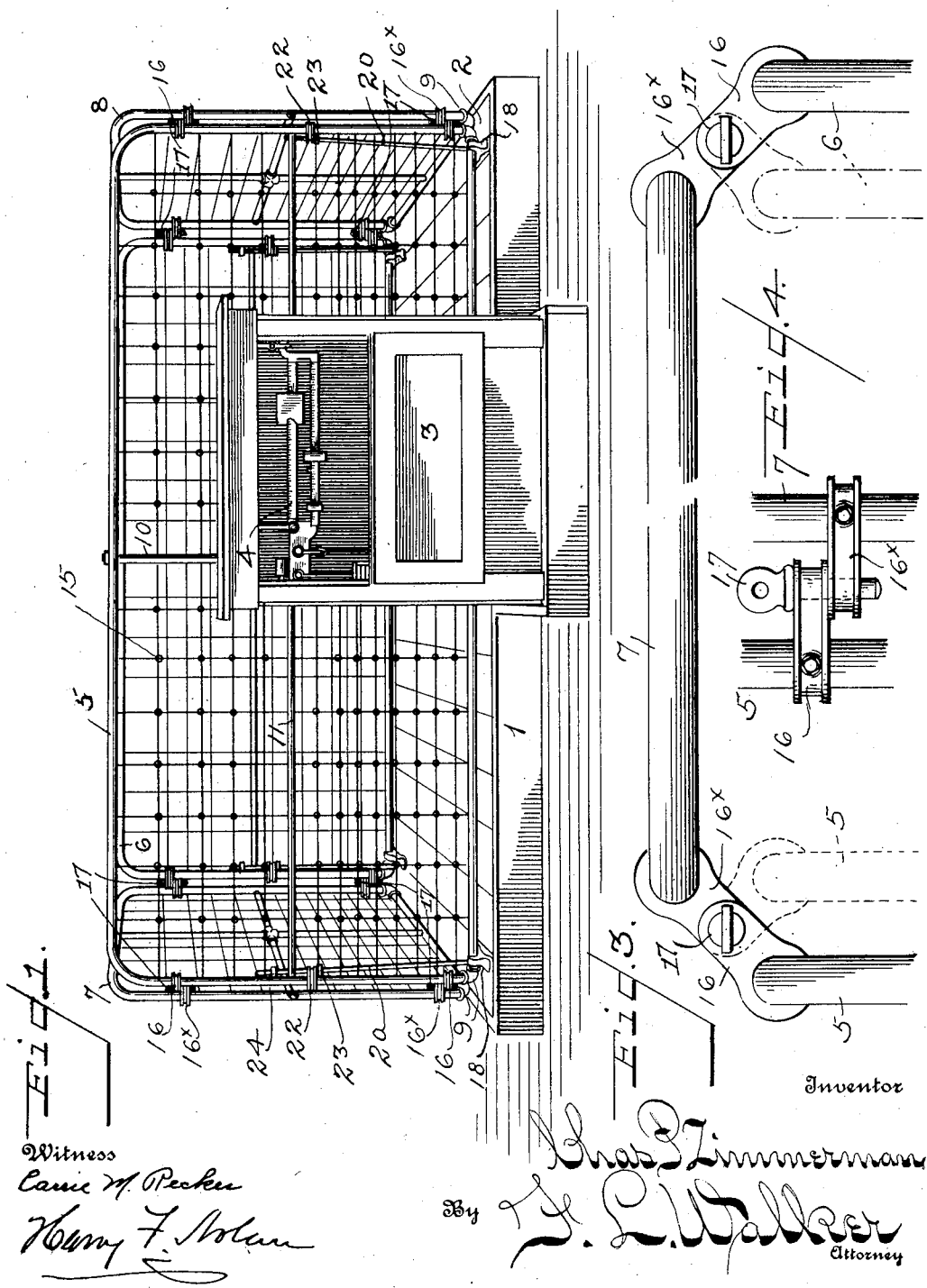

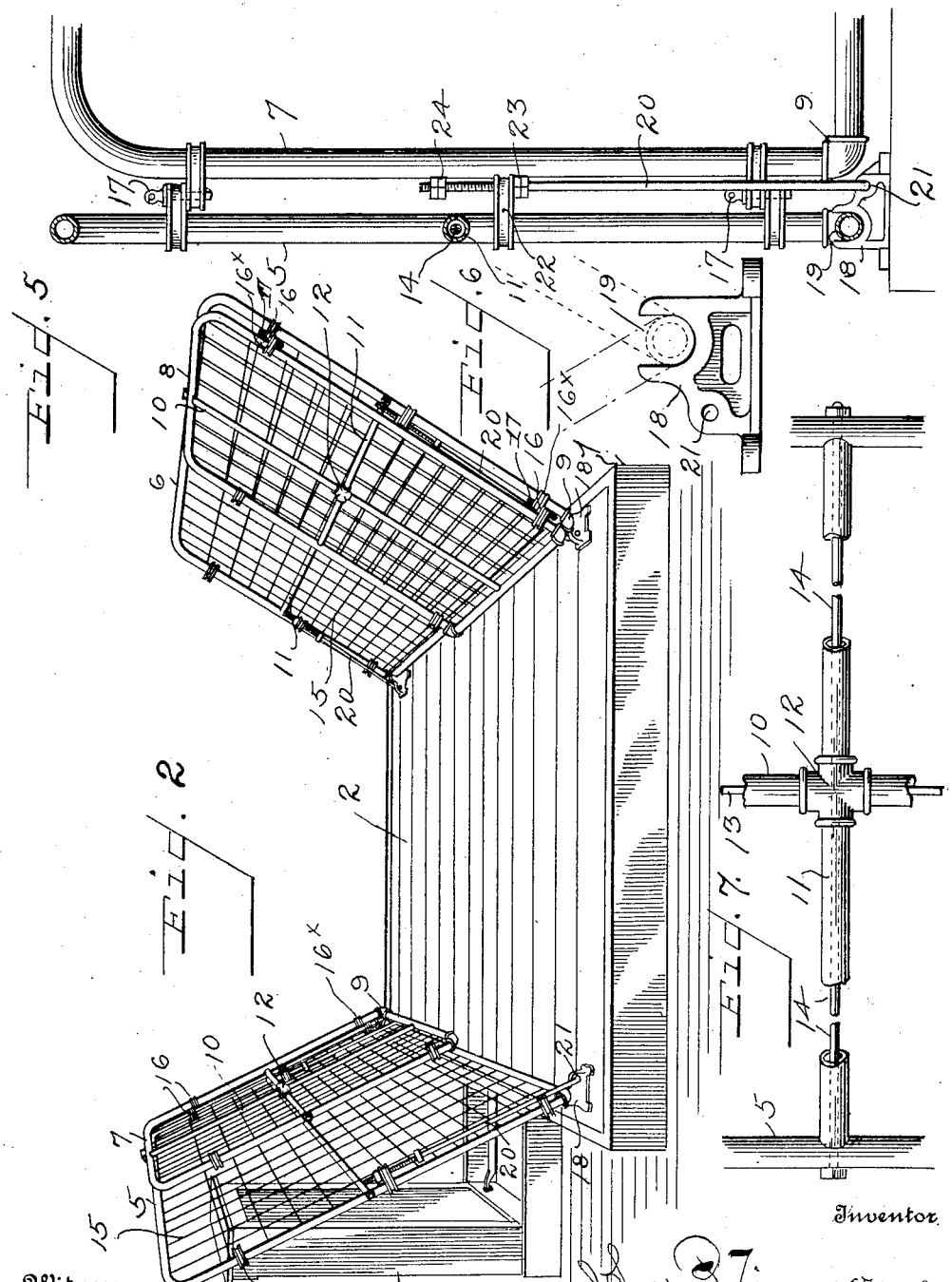

CHARLES P. ZIMMERMAN, OF DAYTON, OHIO, ASSIGNOR, BY MESNE ASSIGNMENTS, TO THE RICHMOND-STANDARD MANUFACTURING COMPANY, OF RICHMOND, INDIANA, A CORPORATION OF INDIANA.

STOCK-RACK.

1,348,343.  Specification of Letters Patent.  Patented Aug. 3, 1920.

Application filed July 17, 1916. Serial No. 109,703.

*To all whom it may concern:*

Be it known that I, CHARLES P. ZIMMERMAN, citizen of the United States, residing at Dayton, in the county of Montgomery and State of Ohio, have invented certain new and useful Improvements in Stock-Racks, of which the following is a specification.

My invention relates to weighing scales and more particularly to stock racks or pens for use in conjunction with scales of comparatively large capacity such as wagon or car scales for the weighing of live stock.

The object of the invention is to simplify the structure as well as the means and mode of operation of such devices whereby they will not only be cheapened in construction, but will be more efficient in use, easily disconnected to permit the weighing of wagons or cars and reassembled for the weighing of live stock, durable, light in weight, and unlikely to get out of repair.

A further object of the invention is to provide an improved form of stock rack which will afford maximum strength to resist lateral pressures of live stock confined therein and which will furthermore afford minimum wind pressure surface. Heretofore stock racks have been usually constructed of wood and much difficulty has been experienced through the action of wind pressure which interferes with the sensitiveness of the scale in weighing operations and furthermore tends to blow the sides of the stock rack down when not in use and results in breakage and deterioration of the stock rack and the scale.

A further object of the invention is to provide gate connections which will operate in either direction and from either side at the will of the operator, and to provide an improved form of limiting stop to support the side frame of the stock rack when in open or disconnected position and to limit their outward swinging movement necessary to accommodate a wagon or car upon the scale.

With the above primary and other incidental objects in view, as will more fully appear in the specification, the invention consists of the features of construction, the parts and combinations thereof, and the mode of operation, or their equivalents, as hereinafter described and set forth in the claims.

Referring to the drawings, Figure 1 is a perspective view of the assembled stock rack in its upright or connected position as adapted for the weighing of live stock. Fig. 2 is a prospective view of the stock rack in its folded or open position as adapted for the weighing of vehicles. Fig. 3 is a top plan view of one end of the assembled or connected rack showing the alternative positions of the end gate when open in dotted and in dot and dash lines. Fig. 4 is an enlarged detail view of the hinge connection. Fig. 5 is an elevation of one corner of the rack in upright or connected position showing the hinge connections of the gate and the limiting stop member, together with the supporting foot or chair. Fig. 6 is a detail perspective view of the supporting foot or chair. Fig. 7 is a detail view of the trussed frame construction.

Like parts are indicated by similar characters of reference throughout the several views.

In the drawings, 1 is the main frame and 2 the platform of a weighing scale of ordinary construction, of which 3 is the beam box and 4 the weighing beam therein. While heretofore it has been customary to mount the stock rack or confining pen upon the main frame of the scale independent of the platform, in the present instance the stock rack or confining pen is preferably, though not necessarily, mounted directly upon the platform. This is possible in the present construction through the fact that the stock rack itself is comparatively light in weight although strong in construction. By mounting the stock rack directly upon the platform accurate weighing is insured as the scale is balanced with the stock rack thereon. It further prevents live stock from interfering with the action of the weighing operation by leaning on or being partially supported by the sides of the stock rack or by standing with one foot off the platform upon the scale frame as is possible with the usual construction.

In constructing the rack or confining pen there are employed two longitudinally disposed side panels 5 and 6 and two end panels or gates 7 and 8. Each of these panels comprises a peripheral frame formed of hollow pipe bent to rectangular form as shown at the top of said panel or connected into rectangular form by pipe fittings as shown at the bottom corners of the panel. In practice it has been found preferable to bend the upper corners of the panels upon comparatively long radius while the lower corners are connected by elbow fittings 9. The hollow pipe forms a comparatively light but strong resilient frame. This frame is further strengthened by transverse mullions comprising pipes 10 and 11 interposed between the vertical and the horizontal members of the frame and joined at their intersection by cross fittings 12. The transverse mullions or pipes 10 and 11 serve merely as spacers bearing against the frame pipes at either end. Extending through the mullions or transverse pipes 10 and 11 are truss rods 13 and 14 which extend through the side and end pipes of the panel frame and are provided with heads and nuts by which the truss rods may be tightened against the spacers or mullions to place the frame under tension.

Secured to the marginal frame on all sides and arranged upon the inner side of the mullions or transverse pipes 10 and 11 are sections 15 of woven wire fence fabric. The strands of this fence fabric are connected at opposite ends to the vertical member of the panel frame and at the top and bottom to the horizontal members thereof and are drawn tight to brace and tension the panel. Being upon the inside of the mullions and truss rods which extend therethrough, any pressure of the live stock being weighed upon the center of the panels is transmitted through the mullions and truss rods to the frame of the structure. It has been found in practice that this construction forms a stiff, rigid and particularly strong structure.

Located in spaced relation upon the vertical or upright members of the panel frame are hinge arms 16 preferably disposed at substantially forty-five degrees inclination to the plane of the panel. The hinge arms 16$^x$ upon the end panel are preferably so spaced as to extend within or between the arms 16 upon the side panels. The purpose of this is to prevent the gate or end panel being accidentally lifted off its hinges. The gate or end panel is supported upon the lower arms 16 and 16$^x$ while the upper arms form a hinge and further prevent the vertical displacement of the end gate or panel. These arms 16 and 16$^x$ are located at opposite sides of both the side and end panels. Removable hinge pins 17 pivotally connect the arms 16 and 16$^x$ one with another, thus a double hinge connection is provided, i. e., hinges at each side of the respective panels. By withdrawing the hinge pin 17 at one side or the other the end gates or panels 7 may be swung inward or outward and in either direction, i. e., to the right or to the left. In Fig. 3 the ends gate is shown by dotted lines swung toward the left while in the same figure by dot and dash lines it is shown swung toward the right. It is optional with the operator as to which way the gate or end panel should swing and is determined wholly by the removal of the hinge pins from one side or the other. This is quite a convenience in driving live stock on and off the scale and for folding or disconnecting the scale to facilitate the weighing of vehicles. The end gates or panels are supported wholly upon the side panels and the latter panels are supported in chairs or brackets 18 secured to the platform 2 of the scale. The chairs or brackets 18 are bifurcated or notched as at 19 within which notches or bifurcations the lower horizontal frame members of the side panels engage. The construction is such that the side panels 7 are capable of an oscillatory movement within the bifurcations of the brackets or chairs 18 from a vertical to an inclined position and vice versa.

Various forms of stop means have heretofore been employed to limit the lateral inclination of the side panels of the stock rack. Usually these have been fixed or permanent stops located outside the scale frame. Such stops not only frequently are in the way of various operations pertaining to weighing of stock and produce, but also are unsightly and unsafe.

To limit the outward inclination of the side panels there is provided a stop rod 20 pivoted at 21 to the supporting chair or bracket 18 and at its upper end slidingly engaging in a stop arm 22 carried upon and projecting inwardly from the vertical frame member of the side panel. The end of the stop rod 20 is screw threaded and carries thereon stop nuts or collars 23 and 24 adjustable to different positions upon the rod and preferably secured in adjusted positions by means of lock nuts. The stop rod 20, being pivotally connected in eccentric relation with the side panel, slides to and fro through a suitable opening in the stop arm 22 as the side panel is oscillated. The oscillation of the side panel is arrested when the panel is in upright position by the engagement of the stop nut or collar 23 with the under side of the stop arm 22. When the side panel is swung outward to inclined position its oscillation is arrested by the engagement of the stop nut or collar 24 with the upper side of the stop arm 22. The degree of oscillation permitted the side panel may be varied either by adjusting the stop arm 22 vertically upon the vertical frame member of the panel or by adjusting the stop nut or collar 23 and 24 upon the stop rod 20. A stop rod 20 and its connections are preferably provided at each end of the side panels 7 and if so desired additional stop means may be provided in the middle of the panel upon the vertical mullion or space pipe 11. However, for ordinary conditions of use it will be found that stop members at the corners of the structure will be sufficient. It is desirable, however, to support the panels at midlength points by means of additional chairs or brackets 18.

From the above description it will be apparent that there is thus provided a device of the character described possessing the particular features of advantage before enumerated as desirable but which obviously is susceptible of modification in its form, proportion, detail construction, or arrangement of parts without departing from the principle involved or sacrificing any of its advantages.

While in order to comply with the statute the invention has been described in language more or less specific as to certain structural features, it is to be understood that the means and construction herein described comprise but one mode of putting the invention into effect and the invention is therefore claimed broadly in any of its possible forms or modifications within the scope of the appended claims.

Having thus described my invention, I claim:

1. In a structure of the character described, parallel side panels, and end panels detachably connecting the side panels one with another, and bifurcated supporting chairs arranged with their bifurcations alined one with another and with the side panel to be engaged therein within which the lower margins of the side panels are loosely seated, said side panels being capable of oscillatory movement within such bifurcations.

2. In a structure of the character described, side panels comprising a marginal frame having a cylindrical base member and a wall of wire strands supported on said frame, end panels detachably connecting the side panels one with another, and bifurcated supporting chairs loosely embracing the lower cylindrical members of the marginal panel frames in relation with which the frames are capable of oscillatory movement.

3. In a structure of the character described, the combination with side panels comprising metallic supporting frames, walls of wire strands supported thereon, and end panels detachably connecting the side panels one with another of bifurcated supporting chairs within the bifurcations of which the longitudinal base members of the side panels are detachably seated for oscillatory movement.

In testimony whereof, I have hereunto set my hand this 10th day of July, A. D. 1916.

CHARLES P. ZIMMERMAN.

Witnesses:
B. H. RANNELLS,
THOMAS B. HERRMAN.